United States Patent Office 2,734,872
Patented Feb. 14, 1956

2,734,872
METHOD OF MAKING LUMINESCENT MATERIALS

Andrew H. Young, Scotia, N. Y., assignor to General Electric Company, a corporation of New York No Drawing. Application October 14, 1952, Serial No. 314,740

5 Claims. (Cl. 252—301.6)

This invention relates to a method for producing luminescent materials at a relatively low temperature in a single-step process.

In the past, a typical method of producing a luminescent material such as a zinc sulfide phosphor has been to prepare zinc sulfide in highly purified form, then add a measured quantity of activator such as manganese, copper, etc., and fire the mixture at a temperature between 1000 deg. C. and 1200 deg. C. for upwards of one-half hour.

It is an object of the present invention to provide a simplified single-step process for producing luminescent materials utilizing oxides as starting materials.

It is a further object of the invention to provide a method of producing luminescent materials without resorting to extremely high temperature treatments.

It is another object of the invention to provide a method for producing luminescent sulfides and selenides in a single-step process utilizing zinc oxide or cadmium oxide as starting materials.

Briefly stated, in accordance with one of its aspects, my invention provides a method of producing a luminescent material which comprises mixing zinc oxide or cadmium oxide with an activator, heating the mixture to a temperature between 450 deg. C. and 900 deg. C., and contacting the mixture with hydrogen sulfide or hydrogen selenide while maintaining the temperature at the 500°–900° C. level.

The zinc and cadmium sulfides and selenides of this invention require the presence of an activating agent if they are to possess luminescent qualities. Any of the activating agents normally used with these phosphors are satisfactory for purposes of my invention. Typical activating agents are manganese, silver, copper, arsenic, and bismuth which may be introduced to the initial mix as metal powders or salts, such as manganese chloride, silver nitrate, etc. While over 10% of the phosphor weight may consist of activating agent, there is usually no benefit resulting from the use of higher proportions of activator and I prefer to have the activator present in quantities of about 1% or less.

The treatment temperature may vary over a wide range including temperatures of less than 450 deg. C. and higher than 900 deg. C. However, at the lower temperatures, the time of treatment must be prolonged while at the higher temperatures, control is difficult due to the vaporization of the activator material as well as other elements present in the mix. I prefer that the treatment temperature be within the range of 450 deg. C. to 900 deg. C. In the case of zinc compounds, the preferred temperature is about 500 deg. C. At this temperature the time of treatment is not prolonged for zinc compounds and control of the final proportions is easily achieved. In the case of cadmium compounds, the preferred treatment temperature is about 900 deg. C. At lower temperatures the time of treatment is undesirably long.

At the optimum temperatures specified above, the starting mixtures take on luminescent characteristics after about one half hour of treatment. These characteristics improve up to a period of about one hour of treatment. Additional treatment does not diminish the luminescent qualities to a significant degree but at the same time, it confers no benefit. Treatment of the mix at the elevated temperature consists in contacting the mixture with hydrogen sulfide or hydrogen selenide gas in accordance with the final product desired.

It is not necessary that the starting materials be restricted only to zinc oxide or cadmium oxide as mixtures of these materials produce satisfactory phosphors. Likewise, the mixture may be treated with both hydrogen sulfide and hydrogen selenide and may have more than one activating agent present. Of the various phosphor combinations described above, I have achieved the most satisfactory results by applying my process to produce a zinc sulfide phosphor activated with about 1% manganese.

To produce a zinc sulfide phosphor activated with manganese, I mix 40 grams of zinc oxide with 20 ml. of a saturated alcoholic solution of zinc chloride and 2 ml. of a saturated solution of manganese chloride. This mixture is placed in a reaction vessel through which gas may be circulated and heated to about 500 deg. C. Hydrogen sulfide gas is circulated through the reaction vessel during the period it is being brought up to heat and thereafter for about one hour. The mixture is then allowed to cool and the manganese activated zinc sulfide phosphor is ready for use. Such a phosphor will luminesce bright yellow.

In the above-described operation, cadmium oxide, other activators, and hydrogen selenide could have been substituted for the compounds used, the only difference in their reaction being that a higher temperature would have been preferred. A phosphor prepared according to my method is a satisfactory fluorescent material and also exhibits electroluminescent qualities provided the activator is present in the higher proportions preferred in electroluminescent cells.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. The method of producing a luminescent material which comprises preparing a mixture consisting of a compound selected from the group consisting of zinc oxide and cadmium oxide and an activator selected from the group consisting of manganese and silver, heating the mixture to a temperature between 500 deg. C. and 900 deg. C. for a period of time in excess of one-half hour, and contacting said mixture with a gas selected from the group consisting of hydrogen sulfide and hydrogen selenide during the temperature treatment.

2. The method of producing a luminescent material which comprises preparing a mixture consisting of zinc oxide and an activator selected from the group consisting of manganese and silver, heating the mixture to a temperature of about 500 deg. C., and contacting the mixture with hydrogen sulfide while maintaining the temperature treatment.

3. A method as claimed in claim 2 wherein the activator is present in the mix to an extent of less than 10% and the temperature treatment is continued for a period of time in excess of one-half hour.

4. The method of producing a manganese activated luminescent material which comprises preparing a mixture consisting of zinc oxide and manganese chloride, heating the mixture to a temperature of about 500 deg. C. for a period of time in excess of one-half hour, and contacting the mixture with hydrogen sulfide while maintaining the temperature treatment.

5. A method as claimed in claim 4 wherein the manganese is present after firing to the extent of about 1%.

References Cited in the file of this patent

UNITED STATES PATENTS

| | | |
|---|---|---|
| 1,560,380 | Hedouville | Nov. 3, 1925 |
| 2,218,750 | Hinderer | Oct. 22, 1940 |

OTHER REFERENCES

Smith: Article in J. Electro Chem. Soc., vol. 93, No. 6, p. 325, June 1948. (Copy in Scientific Library.)